United States Patent [19]

Li et al.

[11] Patent Number: 5,700,440
[45] Date of Patent: Dec. 23, 1997

[54] SELECTIVE OXIDATION OF HYDROGEN SULFIDE IN THE PRESENCE OF IRON-BASED CATALYSTS

[75] Inventors: Kuo-Tseng Li; Yen-Chun Ker, both of Taichung, Taiwan

[73] Assignee: National Science Council, Taipei, Taiwan

[21] Appl. No.: 523,362

[22] Filed: Sep. 5, 1995

[51] Int. Cl.⁶ .................... B01D 53/52; B01D 53/86
[52] U.S. Cl. .................... 423/231; 423/230; 423/573.1; 423/576.8
[58] Field of Search .................... 423/230, 231, 423/576.8, 220, 573.1

[56] References Cited

U.S. PATENT DOCUMENTS

| 4,311,680 | 1/1982 | Frech et al. .................... 423/230 |
| 4,857,280 | 8/1989 | Kay et al. .................... 423/21.2 |

FOREIGN PATENT DOCUMENTS

| 2702675 | 9/1994 | France . |
| 50-39074 | 12/1975 | Japan .................... 423/576.8 |
| 4-90852 | 3/1992 | Japan .................... 423/230 |
| 130654 | 9/1918 | United Kingdom . |
| 305026 | 1/1929 | United Kingdom .................... 423/230 |

OTHER PUBLICATIONS

"Gas Purification" by Kohl et al., 4th ed., Gulf Publishing Co., (1985) No Month pp. 420–425 and 718–719.

J.A. Lagas and J. Borsboom, "Selective-oxidation catalyst improves Claus process", *Oil and Gas Journal*, 86(41), pp. 68–71, (Oct. 10, 1988).

P.F.M.T. van Nisselrooy and J.A. Lagas, "SuperClaus reduces SO₂ emission by the use of a new selective oxidation catalyst", *Catalysis Today*, 16, pp. 263–271, 1993 No Month.

*Primary Examiner*—Gary P. Straub
*Assistant Examiner*—Timothy C. Vanoy
*Attorney, Agent, or Firm*—Hitt Chwang & Gaines, PC

[57] ABSTRACT

The present invention discloses a method of selectively oxidizing hydrogen sulfide to elemental sulfur, in which a $H_2S$-containing gas mixture contacts with an oxygen-containing gas at 50°–500° C. in the presence of an iron-based catalyst. The reaction product mixture contains substantially no sulfur dioxide. The iron-based catalyst, in addition to iron atom, further contains a promoter of cerium, tin or antimony.

11 Claims, No Drawings

SELECTIVE OXIDATION OF HYDROGEN SULFIDE IN THE PRESENCE OF IRON-BASED CATALYSTS

FIELD OF THE INVENTION

The present invention relates to a process for recovering elemental sulfur by selectively oxidizing hydrogen sulfide to elemental sulfur, and in particular to a novel catalyst used therein.

BACKGROUND OF THE INVENTION

In the petroleum refinery processes for producing various fuel oils such as gasoline, diesel and kerosene, etc., the sulfur contained in the crude oils is removed as hydrogen sulfide gas by hydrodesulfurization process. The highly toxic hydrogen sulfide gas is then converted to elemental sulfur in sulfur-recovery plants or so-called Claus plants. The Claus plants can be blamed for part of the hydrogen sulfide emissions, as the sulfur-recovery rate is 90–98% depending on the number of reactors used therein. During the last two decades a great number of Claus tail-gas treating (TGT) processes have been developed to increase the total sulfur-recovery efficiency. Conventional Claus TGT processes involve a hydrogen sulfide absorption step, in which a tail gas containing unreacted hydrogen sulfide is introduced into an alkaline bath. Removing the last percentages of sulfur by means of these conventional Claus TGT processes is expensive, both in terms of capital investment cost and energy consumption. In order to avoid the shortcoming of these solution-absorption type Claus TGT processes, a dry type Claus TGT process has been developed in Netherlands which comprises recovering elemental sulfur from the Claus tail gas by selective oxidation of hydrogen sulfide in the presence of a catalytically active mixture of iron and chromium oxides deposited on an alpha-alumina support [Oil and Gas Journal, 86(41), p. 68–71, (Oct. 10,1988); Catalysis Today, 16, p. 263–271, 1993]. The dry type Claus TGT process is simple and economical; however, the chromium atom contained in the catalyst is a toxic substance.

The primary objective of the present process is to provide a process for recovering elemental sulfur from a gas mixture containing hydrogen sulfide by selective oxidation of hydrogen sulfide in the presence of a iron-based catalyst.

DETAILED DESCRIPTION OF THE INVENTION

The possible reactions between hydrogen sulfide and oxygen are as follows:

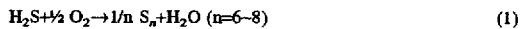 (1)

 (2)

 (3)

 (4)

In the presence of an appropriate catalyst, such as the iron/chromium oxides used in the prior art [Oil and Gas Journal, 86(41), p. 68–71, (Oct. 10,1988); Catalysis Today, 16, p. 263–271, 1993], the reaction (1) will take place while the reactions (2) to (4) are inhibited, i.e. the hydrogen sulfide is selectively oxidized to elemental sulfur, wherein the hydrogen sulfide is converted with a high selectivity into elemental sulfur, while the formation of sulfur dioxide ($SO_2$) is very small even in the presence of an overstoichmetric amount of oxygen.

The present invention discloses a novel catalyst suitable for selective oxidation of hydrogen sulfide to elemental sulfur, which is an iron-based catalyst comprisings iron atom and a promoter selected from the group consisting of cerium atom, tin atom, antimony atom and molybdenum atom.

The present invention also discloses a process for recovering elemental sulfur from a gas mixture containing hydrogen sulfide, which comprises contacting said gas mixture with an oxygen-containing gas at an elevated temperature in the present of an iron-based catalyst, wherein the improvement comprises said iron-based catalyst comprising iron atom and a promoter selected from the group consisting of cerium, tin, antimony and molybdenum.

Preferably, the present iron-based catalyst has a molar ratio of iron atom to the promoter ranges from 1:100 to 100:1, preferably 1:10 to 10:1.

The iron-based catalyst used in the present process may be a metal, metal oxide, metal sulfide, or metal salt, which can be in the form of monolith, particle or pellet, or deposited on a porous carrier selected from the group consisting of alumina, silica and zeolite.

Said elevated temperature of the present process ranges from 50° C. to 400° C., preferably from 100° C. to 350° C.

Pressure has no significant effect on the present process. A suitable pressure for contacting said gas mixture with said oxygen-containing gas in the present process is about 1–10 atm.

Said oxygen-containing gas used in the present process includes (but not limited to) air, oxygen-enriched air, and pure oxygen. Preferably air is used as the oxygen-containing gas.

Said gas mixture containing hydrogen sulfide used in the present process has no limitation on the hydrogen sulfide concentration. However, in the SuperClaus-99 process the hydrogen sulfide concentration contained in the tail gas is controlled at 0.8–3 vol % [Oil and Gas Journal, 86(41), p. 68–71, (Oct. 10,1988); Catalysis Today, 16, p. 263–271, 1993].

The stoichmetric ratio of hydrogen sulfide to oxygen in the reaction (1) is 2:1. Preferably, in the present process said gas mixture is contacted with said oxygen-containing gas with a molar ratio of hydrogen sulfide to oxygen less than 2, i.e. with an overstoichmetric amount of oxygen.

The invention will be further illustrated by the following examples. The following examples are only meant to illustrate the invention, but not to limit it.

EXAMPLES

Preparation of Catalysts

Control Example 1: Iron (III) Oxide Catalyst Deposited on α-Alumina 0.48 g ammonium iron (III) citrate [purchased from Riedel-de Haën, Germany] was dissolved in 4 ml distilled water. To the resulting solution 4 g α-alumina carrier (NGC H-218B, manufactured by Nissan Girdler Catalyst Co., Japan) was added for impregnation. The impregnated α-alumina carrier was dried in room for 24 hours with good circulation of air, and was calcined at 500° C. for five hours to obtain an iron (III) oxide catalyst deposited on α-alumina carrier.

Control Example 2: Cerium (III) Oxide Catalyst Deposited on α-Alumina 0.6 g cerium (III) nitrate hexahydrate [$Ce(NO_3)_3 \cdot H_2O$ available from STREM Chemicals, U.S.] was dissolved in 4 ml distilled water. To the resulting solution 4 g α-alumina carrier (NGC H-218B) was added for impregnation. The impregnated α-alumina carrier was dried in room for 24 hours with good circulation of air, and was calcined at 500° C. for five hours to obtain a cerium (III) oxide catalyst deposited on α-alumina carrier.

Control Example 3: Tin Oxide Catalyst Deposited on α-Alumina 0.3 g $SnCl_2.H_2O$ [available from Riedel-de Haën, Germany] was dissolved in 4 ml distilled water. To the resulting solution 4 g α-alumina carrier (NGC H-218B) was added for impregnation. The impregnated α-alumina carrier was dried in room for 24 hours with good circulation of air, and was calcined at 500° C. for five hours to obtain a tin oxide catalyst deposited on α-alumina carrier.

Control Example 4: Iron (III) Oxide Catalyst 2 g $Fe_2O_3$ powder (manufactured by Showa Chemicals, Inc., Japan) was mixed with 0.4 g bentonite adhesive (purchased from Fisher Scientific Co., U.S.), and the resulting mixture was hot pressed into tablets. The tablets were calcined at 500° C. for 5 hours in air, the calcined tablets were broken and then screened to obtain particles of 10–20 mesh number.

Control Example 5: Antimony Oxide Catalyst 2 g antimony oxide powder (manufactured by Strem Chemicals, U.S.) was mixed with 0.4 g bentonite adhesive (purchased from Fisher Scientific Co., U.S.), and the resulting mixture was hot pressed into tablets. The tablets were calcined at 500° C. for 5 hours in air, the calcined tablets were broken and then screened to obtain particles of 10–20 mesh number.

Control Example 6: Molybdenum Oxide Catalyst

To 25 ml of distilled water 12.35 g (0.01 mole) of ammonium molybdate $[(NH_4)_6Mo_7O_{24}.4H_2O$, manufactured by Riedel-de Haën, Germany], and then nitric acid was added to the resulting solution to maintain the pH value thereof at 1.5 and to yield a Mo metal salt precipitation therein. The solution/precipitation mixture was kept in room for 24 hours, and the precipitation was removed by filtration, and dried at 150° C. for 4 hours. Finally the dried precipitation was calcined at 400° C. for 8 hours to obtain molybdenum oxide catalyst.

Example 1: Iron (III) and Cerium (III) Mixed-Oxide Catalyst Deposited on α-Alumina (a) The procedures of Control Example 1 were repeated to obtain an iron (III) oxide catalyst deposited on α-alumina carrier. (b) 0.6 g cerium (III) nitrate hexahydrate [available from STREM Chemicals, U.S.] was dissolved in 4 ml distilled water. To the resulting solution the iron (III) oxide catalyst deposited on α-alumina carrier prepared in step (a) was added for impregnation. The impregnated solid was dried in room for 24 hours with good circulation of air, and was calcined at 500° C. for five hours to obtain an iron (III) and cerium (III) mixed-oxide catalyst deposited on α-alumina carrier.

Example 2: Iron (III) and Tin Mixed-Oxide Catalyst Deposited on α-Alumina (a) The procedures of Control Example 1 were repeated to obtain an iron (III) oxide catalyst deposited on α-alumina carrier.

(b) 0.3 g of $SnCl_2.2H_2O$ [purchased from Riedel-de Haën, Germany] was dissolved in 4 ml distilled water. To the resulting solution the iron (III) oxide catalyst deposited on α-alumina carrier prepared in step (a) was added for impregnation. The impregnated solid was dried in room for 24 hours with good circulation of air, and was calcined at 500° C. for five hours to obtain an iron (III) and tin mixed-oxide catalyst deposited on a α α-alumina carrier.

Example 3: Iron (III) and Antimony Mixed-Oxide Catalyst (a) 5.46 g of $FeCl_3.6H_2O$ [purchased from Showa Chemicals, Inc., Japan] was dissolved in 10 ml deionized water to obtain an aqueous solution containing iron (III) ions.

(b) 7.36 g of $SbCl_3$ [purchased from Merck, Germany] was added to the aqueous solution of step (a) and dissolved therein.

(c) 5.6 g ammonium carbonate $[(NH_4)_2CO_3$, purchased from Fisher Scientific Co., U.S.] was dissolved in 30 ml deionized water, and the resulting solution was added dropwise through a titration tube to the aqueous solution prepared in step (b) to form a co-precipitation of iron and antimony salts. The precipitate was removed by filtration, washed with 100 ml deionized water, dried and calcined at 500° C. for five hours to yield a mixture of iron (III) and antimony oxides.

(d) 2 g of the mixture of iron (III) and antimony oxides prepared in step (c) was mixed with 0.4 g bentonite adhesive (purchased from Fisher Scientific Co., U.S.), and the resulting mixture was hot pressed into tablets. The tablets were calcined at 500° C. for 5 hours in air, the calcined tablets were broken and then screened to obtain particles of 10–20 mesh number.

Example 4: Iron (III) and Molybdenum Mixed-Oxide Catalyst (a) 2.731 g of $FeCl_3.6H_2O$ [purchased from Showa Chemicals, Inc., Japan] was dissolved in 20 ml deionized water to obtain an aqueous solution containing iron (III) ions.

(b) 1.7838 g of ammonium molybdate $[(NH_4)_6Mo_7O_{24}.4H_2O$, purchased from Riedel-de Haën, Germany] was dissolved in 20 ml deionized water to give an aqueous solution containing molybdenum ions.

(c) The two aqueous solutions prepared in steps (a) and (b) were mixed, and the resulting mixed solution was stirred and heated to a temperature of 70° C.

(d) 1.1354 g ammonium carbonate $[(NH_4)_2CO_3$, purchased from Fisher Scientific Co., U.S.] was dissolved in 30 ml deionized water, and the resulting solution was added dropwise through a titration tube to the mixed solution prepared in step (c) to form a co-precipitation of iron and molybdenum salts. The precipitate was removed by filtration, washed with deionized water to remove the residue ions thereon, dried at 70° C. for eight hours, and calcined at 400° C. for five hours to yield a mixture of iron (III) and molybdenum oxides.

(e) 2 g of the mixture of iron (III) and molybdenum oxides prepared in step (d) was mixed with 0.4 g bentonite adhesive (purchased from Fisher Scientific Co., U.S.), and the resulting mixture was hot pressed into tablets. The tablets were calcined at 500° C. for 5 hours in air, the calcined tablets were broken and then screened to obtain particles of 10–20 mesh number.

Selective oxidation of hydrogen sulfide

Example 5

A continuous fixed bed reactor having an inner diameter of 7 mm, an outer diameter of 9 mm and a length of 80 cm was used in this example. 1 g catalyst in the form of 10–20 mesh number particles was packed into the reactor, in which quartz sand was filled at the feed end of the catalyst bed to form a preheating zone. The reaction temperature was controlled by electrical heaters installed around the reactor. The catalyst bed was pre-sulfurized at 240° C. for 20 hours or longer by introducing a high concentration hydrogen sulfide gas mixture (10 vol % $H_2S$) into the reactor at an elevated temperature until a gaseous reaction product leaving the reactor had a stable hydrogen sulfide concentration. After the presulfurization step, a gaseous feed stream consisting of 1 vol % hydrogen sulfide, 5 vol % oxygen and 94 vol % nitrogen was then introduced into the reactor at 100 ml/min.. The reaction product exiting the reactor was introduced into a gas-solid separator which was maintained at 25° C., in which the reaction product was separated into a solid product and a gaseous product. The composition of the gaseous product was analyzed by a China Chromatography 8900 gas chromatography with a 9 feet long Porapak Q80/100 mesh S.S. coiled column.

The reaction conditions and results are listed in Tables 1–10, in which the conversion (%) is defined as the mole of hydrogen sulfide reacted per mole of hydrogen sulfide in the feed stream, and the selectivity is defined as the mole of elemental sulfur formed per mole of the reacted hydrogen sulfide, which can be calculated as follows:

$$\text{Conversion (\%)} = \frac{H_2S \text{ feeding rate (mole/min.)} - H_2S \text{ exiting rate (mole/min.)}}{H_2S \text{ feeding rate (mole/min.)}} * 100\%$$

$$\text{Selectivity (\%)} = \frac{\text{elemental sulur formation rate (mole/min.)}}{H_2S \text{ feeding rate (mole/min.)} - H_2S \text{ exiting rate (mole/min.)}} * 100\%$$

The elemental sulfur formation rate (mole/min.) is equal to the hydrogen sulfide feeding rate (mole/min.) subtracts the exiting rate (mole/min.) of hydrogen sulfide and subtracts the exiting rate (mole/min.) of sulfur dioxide in the gas product.

TABLE 1

Iron (III) Oxide Catalyst Deposited on α-Alumina Prepared in Control Example 1

| Temperature (°C.) | Conversion (%) | Selectivity (%) |
| --- | --- | --- |
| 180 | 47 | 100 |
| 200 | 56 | 100 |
| 220 | 61 | 100 |
| 230 | 64 | 100 |
| 240 | 70 | 100 |
| 250 | 74 | 100 |
| 260 | 88 | 89 |
| 280 | 96 | 37.5 |

TABLE 2

Cerium (III) Oxide Catalyst Deposited on α-Alumina Prepared in Control Example 2

| Temperature (°C.) | Conversion (%) | Selectivity (%) |
| --- | --- | --- |
| 200 | 11 | 100 |
| 230 | 14 | 100 |
| 250 | 17 | 100 |
| 280 | 20 | 100 |
| 300 | 21 | 99 |
| 320 | 29 | 85 |

TABLE 3

Tin Oxide Catalyst Prepared in the Control Example 3

| Temperature (°C.) | Conversion (%) | Selectivity (%) |
| --- | --- | --- |
| 180 | 21.9 | 100 |
| 230 | 24.3 | 100 |

TABLE 4

Iron (III) Oxide Catalyst Prepared in the Control Example 4

| Temperature (°C.) | Conversion (%) | Selectivity (%) |
| --- | --- | --- |
| 200 | 50.7 | 100 |
| 210 | 59.6 | 100 |
| 220 | 67.9 | 98.9 |
| 240 | 81.3 | 95.6 |
| 260 | 90.7 | 90.8 |
| 280 | 96 | 61.9 |
| 300 | 98.4 | 7.2 |

TABLE 5

Antimony Oxide Catalyst Prepared in the Control Example 5

| Temperature (°C.) | Conversion (%) | Selectivity (%) |
| --- | --- | --- |
| 200 | 13 | 100 |
| 250 | 17.4 | 100 |
| 280 | 25.5 | 100 |
| 300 | 32.9 | 100 |

TABLE 6

Molybdenum Oxide Catalyst Prepared in the Control Example 6 (amount of catalyst used: 2 g)

| Temperature (°C.) | Conversion (%) | Selectivity (%) |
| --- | --- | --- |
| 190 | 9.6 | 100 |
| 200 | 10.4 | 100 |
| 210 | 11.6 | 100 |
| 220 | 17.1 | 100 |
| 240 | 23.0 | 100 |
| 250 | 28.4 | 100 |
| 260 | 38.5 | 83.6 |
| 270 | 61.5 | 55 |

TABLE 7

Iron (III) and Cirium (III) Mixed-Oxide Catalyst Deposited on α α-Alumina Prepared in Example 1

| Temperature (°C.) | Conversion (%) | Selectivity (%) |
|---|---|---|
| 200 | 79 | 100 |
| 230 | 91 | 100 |
| 250 | 94 | 100 |
| 280 | 100 | 98 |
| 300 | 100 | 92 |

Comparing the data of Table 7 with Table 1 and Table 2, it can be seen that the iron (III) and cerium (III) mixed-oxide catalyst deposited on α-alumina has significantly higher conversion and selectivity for the selective oxidation reaction of $H_2S$ than α-alumina supported iron (III) single oxide catalyst and α-alumina supported cerium (III) single oxide catalyst. This indicates that cerium atom is an effective promoter to iron (III) oxide catalyst for the selective oxidation reaction of $H_2S$ to elemental sulfur.

TABLE 8

Iron (III) and Tin Mixed-Oxide Catalyst Deposited on α-Alumina Prepared in Example 2

| Temperature (°C.) | Conversion (%) | Selectivity (%) |
|---|---|---|
| 180 | 28 | 100 |
| 200 | 48 | 100 |
| 220 | 72 | 100 |
| 240 | 79 | 100 |
| 260 | 84 | 100 |
| 280 | 87 | 100 |
| 300 | 90 | 100 |
| 320 | 92 | 98 |
| 340 | 96 | 95 |

The date in Table 1, 3, and 8 show that tin atom is also an effective promoter to iron (III) oxide catalyst for the selective oxidation reaction of $H_2S$ to elemental sulfur in terms of higher conversion and selectivity.

TABLE 9

Iron (III) and Antimony Mixed-Oxide Catalyst Prepared in Example 3

| Temperature (°C.) | Conversion (%) | Selectivity (%) |
|---|---|---|
| 200 | 92.7 | 100 |
| 210 | 94.9 | 95.6 |
| 220 | 95.8 | 72.8 |
| 240 | 97.9 | 71.3 |

The data in Tables 4, 5 and 9 show that antimony atom is also an effective promoter to iron (III) oxide catalyst for the selective oxidation reaction of $H_2S$ to elemental sulfur in terms of higher conversion and selectivity.

TABLE 10

Iron (III) and Molybdenum Mixed-Oxide Catalyst Prepared in Example 4

| Temperature (°C.) | Conversion (%) | Selectivity (%) |
|---|---|---|
| 180 | 39.06 | 100 |
| 190 | 46.24 | 100 |
| 200 | 55.92 | 100 |
| 210 | 67.35 | 100 |
| 220 | 80.95 | 100 |
| 230 | 88.85 | 96.95 |
| 240 | 94.81 | 90.27 |

It can be seen from Tables 4, 6 and 10 that molybdenum atom is also an effective promoter to iron (III) oxide catalyst for the selective oxidation reaction of $H_2S$ to elemental sulfur in terms of higher conversion and selectivity.

What is claimed is:

1. A process for recovering elemental sulfur from a gas mixture containing hydrogen sulfide consisting essentially of contacting said gas mixture with an oxygen-containing gas to result in a gas having a molar ratio of hydrogen sulfide to oxygen that is less than 2 in an temperature range of from about 50° C. to about 400° C. in the presence of a supported iron (III) oxide catalyst, and a promoter for the selective oxidation of hydrogen sulfide to elemental sulfur, said promoter is a cerium component, a tin component, or an antimony component.

2. A process according to claim 1 wherein said promoter is a cerium component.

3. A process according to claim 1 wherein said promoter is a tin component.

4. A process according to claim 1 wherein said promoter is an antimony component.

5. A process according to claim 1 wherein said iron-(III) oxide catalyst has a molar ratio of iron atom to said promoter ranging from 1:100 to 100:1.

6. A process according to claim 5 wherein said iron-(III) oxide catalyst has a molar ratio of iron atom to said promoter ranging from 1:10 to 10:1.

7. A process according to claim 1 wherein said temperature ranges from about 100° C. to about 350° C.

8. A process according to claim 1 wherein said iron-(III) oxide catalyst is in the form of monolith, particle or pellet.

9. A process according to claim 1 wherein said iron-(III) oxide catalyst is supported on a porous carrier selected from the group consisting of alumina, silica and zeolite.

10. a process according to claim 1 wherein said oxygen-containing gas is air.

11. A process according to claim 1 wherein said gas mixture contains 0.8–3 vol % of hydrogen sulfide.

* * * * *